(12) United States Patent
Valgenti et al.

(10) Patent No.: US 10,009,372 B2
(45) Date of Patent: Jun. 26, 2018

(54) METHOD FOR COMPRESSING MATCHING AUTOMATA THROUGH COMMON PREFIXES IN REGULAR EXPRESSIONS

(71) Applicant: Petabi, Inc., Irvine, CA (US)

(72) Inventors: Victor C. Valgenti, Irvine, CA (US); Min Sik Kim, Irvine, CA (US)

(73) Assignee: PETABI, INC., Irvine, CA (US)

( * ) Notice: Subject to any disclaimer, the term of this patent is extended or adjusted under 35 U.S.C. 154(b) by 0 days. days.

(21) Appl. No.: 14/806,407

(22) Filed: Jul. 22, 2015

(65) Prior Publication Data

US 2016/0028766 A1 Jan. 28, 2016

Related U.S. Application Data

(60) Provisional application No. 62/028,310, filed on Jul. 23, 2014.

(51) Int. Cl.
*H04L 29/06* (2006.01)

(52) U.S. Cl.
CPC ...... *H04L 63/1458* (2013.01); *H04L 63/1416* (2013.01); *H04L 63/1425* (2013.01); *H04L 63/20* (2013.01)

(58) Field of Classification Search
CPC ............. H04L 63/1416; H04L 63/1458; H04L 63/1441; G06F 21/554; G06F 2221/033
USPC .......................................................... 726/23
See application file for complete search history.

(56) References Cited

U.S. PATENT DOCUMENTS

| | | | |
|---|---|---|---|
| 7,356,663 B2* | 4/2008 | Jain ..................... | H04L 63/1408 711/122 |
| 2006/0101195 A1* | 5/2006 | Jain ..................... | H04L 63/1408 711/104 |
| 2008/0189784 A1* | 8/2008 | Mangione-Smith .. | G06F 21/566 726/23 |

OTHER PUBLICATIONS

Michela Becchi and Patrick Crowley, A Hybrid Finite Automaton for Practical Deep Packet Inspection, In the proceedings of the 2007 ACM CoNEXT Conference, pp. 1:1-1:12, ACM, New York, USA, 2007.

Holger Dreger, Anja Feldman, Vern Paxson, and Robin Sommer, Operational Experiences with High-volume Network Intrusion Detection, In Computer and Communications Security, pp. 2-11, ACM, New York, USA, 2004.

(Continued)

*Primary Examiner* — William S Powers
(74) *Attorney, Agent, or Firm* — Nixon Peabody LLP; Eduardo J. Quinones (57) ABSTRACT

The present disclosure provides a means for compressing Non-deterministic Finite Automata (NFA) for faster matching during Deep Packet Inspection (DPI) when a Network Intrusion Detection System (NIDS) is evaluating traffic to find suspicious network traffic. The present disclosure accomplishes this through four primary components. First, it provides a time-efficient method for accurately comparing two regular expressions so that common prefixes can be identified. Second, it provides a time-efficient method for grouping regular expressions by their common prefixes. Third, it provides a method for subgrouping within groups by longest common prefixes in order to maximize compression. Finally, it provides a method for building a compressed NFA using heuristics derived from the length of the common prefix to a subgroup.

8 Claims, 9 Drawing Sheets

(56) References Cited

OTHER PUBLICATIONS

Mark Handley, Vern Paxson, and Christian Kreibich, Network Intrusion Detection: Evasion, Trace Normalization, and End-to-end Protocol Semantics, In the proceedings of the 10th USENIX Security Symposium, Berkley, USA, 2001.

Tao Jiang and B. Ravikumar, Minimal NFA Problems are Hard, In the journal of the Society for Industrial and Applied Mathematics (SIMA), vol. 22, No. 6, pp. 1117-1141, SIMA, 1993.

Sailesh Kumar, Sarang Dharmapurikar, Fang Yu, Patrick Crowley, and John Turner, Algorithms to Accelerate Multiple Regular Expressions Matching for Deep Packet Inspection, In SIGCOMM Computer Communications Review, vol. 36, No. 4, pp. 339-350, ACM, New York, USA, 2006.

Chad Meiners, Jignesh Patel, Eric Norige, Eric Torng and Alex X. Liu, Fast Regular Expression Matching Using Small TCAMs for Network Intrusion Detection and Prevention Systems, In the proceedings of USENIX Security, pp. 8, USENIX, Berkley, USA, 2010.

Abhishek Mitra, Walid Najjar and Laxmi Bhuyan, Compiling PCRE to FPGA for Accelerating SNORT IDS, In the proceedings of the ACM/IEEE Symposium on Architectures for Networking and Communications Systems, pp. 127-136, ACM, New York, USA, 2007.

Daniele Paolo Scarpazza and Gregory P. Russell, High-performance Regular Expression Scanning on the Cell/B.E. Processor, In the proceedings of the International Conference on Supercomputing, pp. 14-25, ACM, New York, USA, 2009.

Randy Smith, Christian Estan, and Somesh Jha, Backtracking Algorithmic Complexity Attacks Against a NIDS, In the proceedings of the 22nd Annual Computer Security Applications Conference, pp. 89-98, IEEE Computer Society, Washington DC, USA, 2006.

Randy Smith, Christian Estan, Somesh Jha, and Shijin Kong, Deflating the big bang: Fast and scalable deep packet inspection with extended finite automata, In SIGCOMM Computer Communication Review, ACM, New York, USA, 2008.

Randy Smith, Neelam Goyal, Justin Ormont, Karthikeyan Sankaralingam, and Christian Estan, Evaluating GPUs for Nnetwork Packet Signature Matching, In the proceedings of the IEEE International Symposium on Performance Analysis of Systems and Software, pp. 175-184, IEEE, Washington DC, USA, 2009.

Ken Thompson, Programming Techniques: Regular Expression Search Algorithm, In Communications of the ACM, vol. 11, No. 6, pp. 419-422, ACM, New York, USA, 1968.

Victor C. Valgenti, Jatin Chhugani, Yan Sun, Nadathur Satish, Min Sik Kim, Changkyu Kim, and Pradeep Dubey, GPP-grep: High-speed Regular Expression Processing Engine on General Purpose Processors, In the proceeding of the International Symposium on Research in Attacks, Intrusions, and Defense (RAID). Lecture Notes in Computer Science, pp. 334-353, 2012.

Victor C. Valgenti and Min Sik Kim, Simulating Content in Traffic for Benchmarking Intrusion Detection Systems, In the proceedings of the 4th International ICST Conference on Simulation Tools and Techniques, pp. 44-50, ICST, Brussels, Belgium, 2011.

Victor C. Valgenti, Hai Sun, and Min Sik Kim, Protecting Run-time Filters for Network Intrusion Detection Systems, In Proceedings of the IEEE Conference on Advanced Information Networking and Applications (AINA), pp. 116-127, IEEE, Washington DC, USA, 2014.

* cited by examiner

Regular expression /ab+cdef/

FIG. 9a

Regular expression /ab+cghi/

FIG. 9b

Common prefix NFA

FIG. 10a

Regular expression /ab+cdef/ without prefix

FIG. 10b

Regular expression /ab+cghi/ without prefix

METHOD FOR COMPRESSING MATCHING AUTOMATA THROUGH COMMON PREFIXES IN REGULAR EXPRESSIONS

BACKGROUND OF THE DISCLOSURE

Field of the Invention

The present disclosure relates to the field of network intrusion detection technology, and more particularly to a method for compressing matching automata through common prefixes in regular expressions.

Description of the Related Art

Finding known suspicious patterns in network data streams is a vital task for modern networks. Network Intrusion Detection Systems (NIDS) perform this function of dividing network traffic into two groups: suspicious and benign. Suspicious traffic is often determined by a byte-by-byte examination of the data in a particular network datagram. The NIDS contain a set of patterns that are known to be suspicious. These known suspicious patterns are typically expressed as fixed-strings or as regular expressions. Fixed-strings represent a single, unchanging, string of characters (binary or otherwise) like the word: "Host" or "User-agent." As implied in the name, a fixed-string will never match to any pattern other than itself. A regular expression, however, describes an entire language that can be recognized by the expression. For example, the regular expression "ab*cd" can match the inputs acd, abcd, abbcd, and so on. Regular expressions provide far more expressive power to the pattern creator. This power can be used to make more dynamic patterns that can not only eliminate false positives but also defeat evasive tactics employed by rogue traffic. The wider context of regular expressions makes them far more valuable to NIDS than fixed-strings as they provide both more specific and more dynamic matching. However, this improved matching comes at the cost of greater complexity.

The greater complexity of regular expression matching requires more careful use of resources in order to match efficiently. Greater efficiency is typically achieved by improving the matching algorithm, such as in Hybrid Automata, Extended Finite Automata (XFA), and Delayed Input Deterministic Finite Automata ($D^2FA$) or by exploiting parallelism in hardware using Field Programmable Gate Arrays, Graphics Processing Units (GPU), Cell processors, and Ternary Content Addressable Memory or by exploiting both hardware parallelism on modern General Purpose Processors (GPP) and creating an architecture-friendly layout of the matching automaton as in GPP-grep.

Despite these advances in matching architectures and hardware, matching is still plagued by a significant problem: the substantial size of the matching automaton. Larger matching automata, regardless the architecture or hardware implementation, require more resources during matching. In some instances matching automata can grow so large as to not fit in the available memory for only a couple hundred regular expressions. The average NIDS typically has thousands of regular expressions. Efforts have been made to compress the Deterministic Finite Automata (DFA), but such compression leads to more overhead during matching. Finally, complex regular expressions, particularly those with lots of repetition and counting, when compiled into a single Non-deterministic Finite Automata (NFA), can create matching automata with many redundant paths as minimizing this redundancy is a hard problem.

SUMMARY OF THE DISCLOSURE

The present disclosure relates to regular expression matching particularly as a component of pattern matching in Network Intrusion Detection Systems (NIDS). However, the present disclosure does extrapolate beyond this very specific field and is applicable wherever Non-deterministic Finite Automata (NFA) is used for matching regular expressions to binary or textual input. The present disclosure relates to a method for building NFA used as a matching automaton for regular expressions and can be applied to other processes for improving the efficiency of the matching automaton.

The present disclosure adopts a different approach from improving the matching algorithm or exploiting parallelism in hardware. Rather than defining a method to match regular expressions, the present disclosure offers a method for compressing and improving the efficiency of the NFA used in matching. Since any matcher can use an NFA, the present disclosure can be used by the previously stated techniques. However, the present disclosure provides a novel compression technique, separate from current NFA reduction techniques, and is targeted to NIDS. In fact, the present disclosure employs several novel techniques to provide a heuristic solution to the hard problem of NFA compression.

The present disclosure works by identifying regular expressions that share a common prefix. The data structure of the matching automaton is that of an NFA. An NFA is an automaton that expresses a regular expression, or multiple regular expressions, as a directed graph. An input is provided to the NFA as a series of symbols or bytes where each byte represents a symbol. For each symbol, the active state may move from its current position to another state dependent on the provided symbol. This is termed the NFA traversal. At any given state, a single symbol could have multiple outgoing transitions which will cause the creation of another active state for each possible transition. Thus, when applying a particular input to an NFA, all possible paths are explored in parallel. If a final state is reached it is known that the input matches one of the patterns. If the end of the input is reached prior to a final state, then the input does not match. One of the difficulties in using an NFA for matching is that minimizing NFA is a hard problem requiring heuristic techniques to solve.

The present disclosure uses common prefixes among the regular expressions as a heuristic to help in the construction of the NFA. This has two effects on the NFA. First, the total number of states in the NFA is reduced over that of typical NFA construction algorithms like Thompson's algorithm. This reduction comes from removing redundant paths from the start of the NFA. Further, the absence of these redundant paths means a reduction of the total paths that must be traversed (i.e. fewer active states) when traffic matches deeply with the NFA. These two factors translate into greatly improved throughput when matching against input that matches deeply with the NFA.

One objective of the present disclosure is to create unified matching automata that are capable of maintaining multi-gigabit throughput even when traffic matches deeply with the rule set. For matching automata of substantial size (i.e. more than a few dozen regular expressions) the matching throughput drops significantly as the input more deeply intersects with the rule set. This drop in performance can prove to be so substantial as to render some NIDS useless in pandemic or near pandemic situations. It opens NIDS to potential Denial of Service (DOS) attacks where an attacker can craft specifically made packets to bog-down the system in order to mask their true attack.

The present disclosure works to mitigate this possibility by reducing the state required for matching deeply into the automaton. The present disclosure can serve to ensure that the NIDS resources are not exhausted and that every packet seen by the NIDS can be examined and cataloged. Further, we note that an NFA, as a construct, is typically the first step prior to creating a Deterministic Finite Automata (DFA) which is the most common form of matching automata used in NIDS. The significance of this fact is that the minimized NFA created can then be translated into a minimized DFA that can then work with other approaches that require a DFA as the matcher.

The present disclosure comprises four processes to support the evaluation of regular expressions and ultimate compression into a single NFA.

The first process converts regular expressions into transition sequences. This process normalizes regular expressions in a way that allows side-by-side comparison of two regular expressions in linear time. Without this step, it is impossible to accurately compare two regular expressions in a time-efficient manner. As a result, the transition sequence conversion is a primary feature of this disclosure.

The second process is the grouping of regular expressions by a minimum shared prefix length. By using a prefix j in length we are certain that all regular expressions that have a common prefix greater than or equal to j will end up in the same group in the group map. The primary benefit of this first-tier grouping is that it reduces the size of the sets from which longest common prefix matches are derived. This greatly improves the average runtime of the algorithm as identifying the longest common prefix for a single regular expression requires comparing that regular expression to all other regular expressions within the group which is infeasible for very large groups. However, groups that share a prefix j in length (for a sufficiently long j) tend to create much smaller groups than the entire set of regular expressions greatly mitigating much of the cost of determining the longest common prefixes within a group.

The third process is subgrouping of groups into subgroups containing longest common prefix matches. It requires that each regular expression in a group be compared to every other regular expression in the group. In order for this to work effectively it is best to keep groups small, where possible. This underscores the importance of the grouping process explained earlier. The end result is that the set of regular expressions for the group are further organized by their longest common prefix, or remain a singleton if the subgrouping process could not find an optimal longest common prefix for a particular regular expression within a group.

The final process is merging the regular expressions first within subgroups, then within groups, then among groups until a single NFA is constructed that is both prefix-minimal and semantically correct. This is an iterative process by which first all regular expressions in a subgroup are converted into NFA and merged into a single subgroup NFA. Then the subgroup NFA are merged by the longest common prefixes among the subgroups until a group NFA is created. The group NFA are then merged, through the use of a decremented minimum shared prefix length that clusters groups by a new, shorter, index. Finally, when the minimum shared prefix length has reached zero, all remaining groups are directly added to the prefix-minimal NFA and the process is completed.

These four processes are to effect the compression according to the present disclosure which can result in remarkable gains in throughput as a direct result of similar reductions in the amount of 'Active State' required by the matcher. Further, this compression can result in a substantial reduction in the overall size of the matcher.

The present disclosure is designed with network intrusion detection in mind. Matching automata are vulnerable to DOS attacks due to the fact that tracking deep matches against a large rule set requires a large amount of state. The present disclosure helps alleviate this problem by reducing the amount of state required for the deep matches. Thus, the present disclosure is primarily meant as a processing step for matching automata used by NIDS. Essentially, the set of regular expressions are compressed by the present disclosure into an NFA that will match for any of the regular expressions in the rule set. This compressed NFA can then be converted into any of the popular unified matching automata systems such as Hybrid Automata, XFA, and $D^2FA$, and GPP-grep. The present disclosure simply builds the NFA, and thus is general enough to fit into any system that employs either an NFA, or DFA matcher because a DFA can be easily constructed from an NFA. In fact, it is normal practice to construct an NFA prior to constructing a DFA.

In addition, the present disclosure is general enough that it can be used in fields outside of network security. For example, the present disclosure can speed results for finding patterns across large data sets having large numbers of regular expressions. The present disclosure is applicable for any circumstance where multiple regular expressions need to be compared against a large amount of inputs, regardless of whether the inputs are database fields, documents, or network streams.

The present disclosure will help make matching of large sets of regular expressions against a heavy volume of input at high speeds (gigabit and multi-gigabit) a reality. As most NIDS are vulnerable to DOS, the present disclosure improves the ability of NIDS to handle deeply matching traffic thus making the NIDS more resilient to DOS attacks. In many cases, the present disclosure may replace filtering technologies employed by current NIDS that are still vulnerable to DOS.

DETAILED DESCRIPTION OF THE EMBODIMENTS

I. Method for Identifying Common Prefixes in Regular Expressions

A common prefix in regular expressions is heretofore defined as two or more regular expressions that share, semantically, the same initial sequence of transitions (i.e. characters) from the start of each regular expression to some point up to the end. If the length of the common prefix is the length of all regular expressions involved, then all regular expressions so defined are semantically equivalent. The common prefix has the following qualities. First, the common prefix is semantically equivalent between all regular expressions involved. This states that, for the regular expressions $RE_1$=ab and $RE_2$=ac where a, b, and c represent sequences of transitions 1 or more in length, the two regular expressions can be merged into RE'=ab∪ac. From this, we can see that RE' accepts (a∧b)∨(a∧c). Through the distributive property of logic equations it is clear that the RE' accepts a∧(b∨c). In this circumstance, a represents the common prefix. Further, all regular expressions sharing the common prefix a can be combined to create a language captured by the regular expression: a(b|c| . . . ) for some arbitrary number of regular expressions. The second quality of the common prefix is that it has a length greater than zero and up to the length of the shortest regular expression within a group of regular expressions sharing that common prefix.

Identifying a common prefix is not trivial. First, the transcription of similar regular expressions may diverge greatly while the semantics remain equivalent. For example, a(b|c)de and a(c|b)de are semantically equivalent. The most complete method to identify similarity between two regular expressions would be to convert both regular expressions into NFA, then create a new NFA that is a Cartesian product of the original two NFA while decorating each edge to indicate if that edge is in both graphs or not. A shortest path traversal through this new NFA could be used to indicate the amount of similarity between two regular expressions. However, this technique is unsuitable for more than a few regular expressions. The reason is that the Cartesian product generation requires exponential time. Note that every regular expression must be compared to every other regular expression and then the task becomes computationally unfeasible.

One primary contribution of the present disclosure is providing a time-efficient algorithm for comparing regular expressions to identify common prefixes. This is done by making the observation that a single regular expression is linear. By linearity we mean that the regular expression starts at a root, then simply concatenates to itself a series of possible symbols until it reaches an end, excluding assertions and back-references as available in Perl Compatible Regular Expressions. As such, any single regular expression shares two common qualities. First, there are no cycles except for self-references for most regular expressions, although repetition attached to groups can lead to cycles. This means that, for any state in the NFA generated from the regular expression, outgoing transitions will refer to itself, to a state deeper into the NFA with the exception of fallback transitions for failure to match, or to groups that have repetition attached to them. However, fallback transitions are more about the input than the regular expression and thus can largely be dealt with at run time, while groups can be handled through recursion. Thus, the basic NFA can be described in what is essentially a linear format. This implies that the NFA for a regular expression is simply a description of one or more possible sequences of transitions. Secondly, all regular expressions can be parsed into a parse tree.

These two qualities of regular expressions allow us to make some simplifications, when comparing regular expressions, greatly reducing the time required for the comparison. Since each regular expression can be converted into a parse tree in linear time, it is known that there is a time-efficient means of building parse trees for any regular expression. Second, we note that the parse tree for a regular expression is just a series of concatenations of possible symbols. Any given concatenation within the parse tree ties together two transition sets, or sequences of transitions sets, where a transition set represents all the valid outgoing symbols from one state to another. Given this intuition we can simply flatten the parse tree into a multi-set of transition sets to create a linear sequence of transitions sets from the start of the regular expression to the end. This flattened series of transitions sets is termed the transition sequence where each step in the sequence represents all possible transitions at that depth. Transitions are consistently ordered within the transition set, and transition sets are consistently ordered at each step in the transition sequence allowing one transitions sequence to be compared to another transition sequence using a longest common subpattern comparison.

Figure 1:
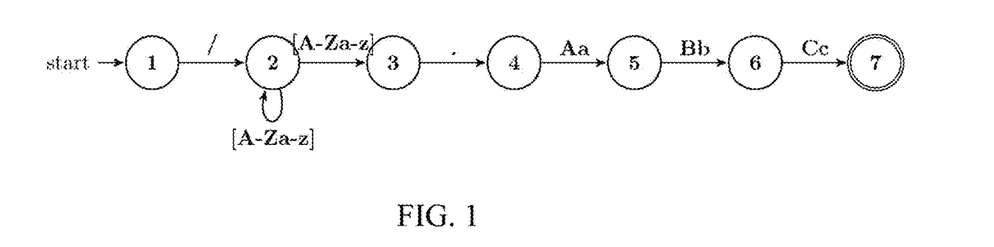
FIG. 1 is an NFA depiction of the regular expression //[a-z]+\.abc/i.
Figure 2:
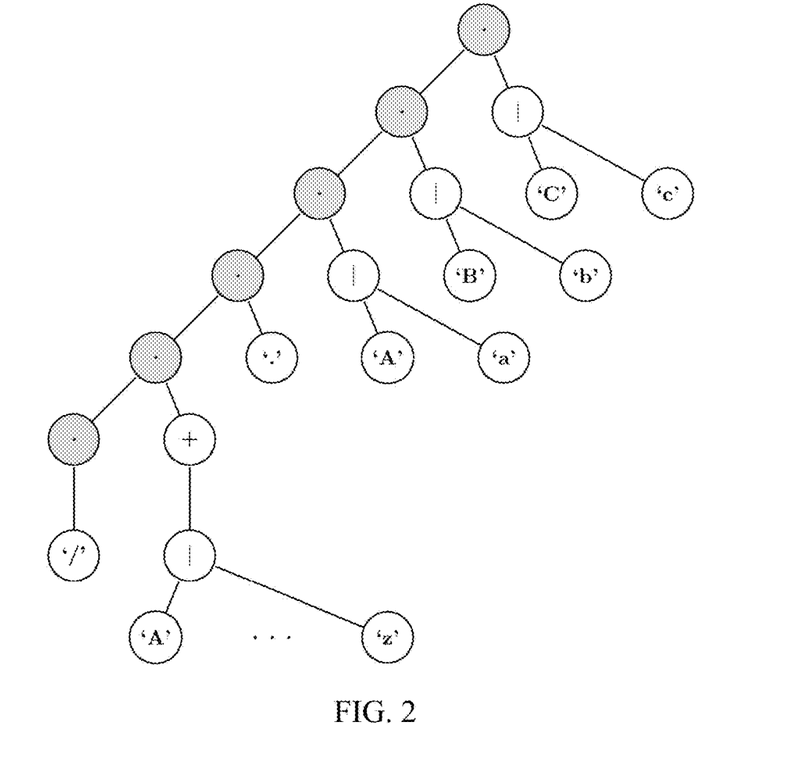
FIG. 2 illustrates a parse tree of the regular expression //[a-z]+\.abc/i.
Figure 3:
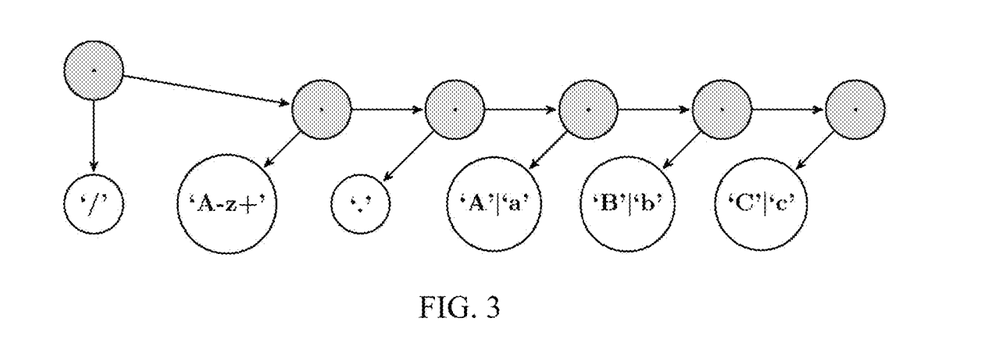
FIG. 3 illustrates a flattened parse tree of the regular expression //[a-z]+\.abc/i.

For example, FIG. 1 is an NFA depiction of the regular expression //[a-z]+\.abc/i. As can be seen from FIG. 1, the NFA is linear with the exception of the self-reference to node 2. This illustration excludes fallback transitions to the start state in case of non-match as those can be assumed. The lack of cycles is a key element of how the present disclosure is able to simplify the comparison process between two regular expressions. Further FIG. 2 illustrates the parse tree of the regular expression while FIG. 3 illustrates the flattened parse tree of the regular expression.

However, as noted, use of alternation and grouping can cause cycles in the NFA produced by a regular expression. Our observation is that the alternation and grouping represent full regular expressions that are only a part of a larger regular expression. These alternate regular expressions have their own fully-developed subtrees within the parse tree of the whole regular expression. As such, we can still apply our concept of linearity of regular expressions. It just becomes necessary to recursively apply this concept across alternate branches.

Figure 4:
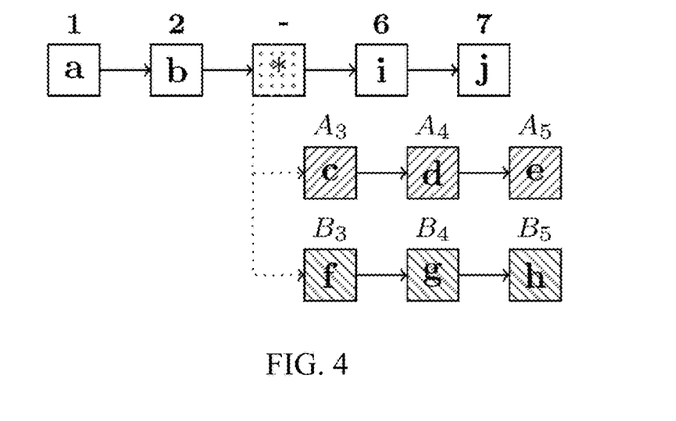
FIG. 4 illustrates how alternation is handled when creating a transition sequence.

FIG. 4 illustrates how alternation is handled recursively. The numbers above each step represent the depth in number of steps to a particular transition. The letters for the branches indicate the ordering of the branching. As such, this regular expression represents the parsing of /ab(cde|fgh)ij/ and illustrates that steps 3, 4, and 5 must be conducted in parallel across what amount to two separate regular expressions. Since the alternate branches are ordered consistently, it is not necessary to conduct any comparison in parallel further strengthening the power of this heuristic.

More specifically, this process works as follows. The regular expression is converted to a parse tree. Starting at the root, each concatenation of transitions is compressed into a single transition set at that depth in the transition sequence. When alternation occurs in the regular expression, the entire branch is recursively explored in the same means, adding all transition sets to the transition sequence as per the current depth. In other words, parallel sequences are laid into the transition sequence when alternation occurs, which will result in more than one transition set at a given depth. These alternate branches are maintained at each depth in a consistent ordering. Repetition is decorated onto any step within a transition sequence. The end result is a sequence of transitions sets from the start, or root, of the regular expression to all of its end states with multiple transitions possible in each transition set, and multiple transition sets possible at each step in the sequence.

This is a powerful heuristic in that it allows pairwise comparison between two regular expressions. With this method it is now possible to take two regular expressions and convert them into transition sequences. The transitions sequences can now be compared, side-by-side, from the beginning of both the sequences until they no longer match. Comparison at each step is a pairwise comparison of each branch's transition set at that depth (hence the ordering of branches at each step). For every step that two regular expressions match, we increase a counter. At some point one (or both) of the transition sequences will end, or the transition sets at a given step will no longer match. Comparison stops at that point and returns the value of the counter which represents the length of the common prefix. The only remaining detail that must be noted is that transitions within the transition set must be in a consistent ordering and transition sets within a step must also be in a consistent ordering (as already mentioned). Transitions sets are represented by a bitmap for all possible transitions ordered numerically from 0 to 255 (assuming single byte characters). Transition sets that reference alternation simply point to another transition sequence that contains one or many transition sets. The specific ordering is less important than a consistent ordering. As long as the ordering is consistent given a particular set of transition sets, then the comparison between two steps that share identical transition sets must also be consistent. In other words, if the regular expressions share a common prefix, then their transitions sequences must remain identical for that common prefix. Thus, it is possible to walk through a set of transition sequences and simply compare the transition sequences at a certain depth. If they match, they share a transition at that depth. If the depth begins from 0 and continues forward to some value k, then the regular expressions share a common prefix k in length.

This process requires linear time to create a parse tree, and linear time to build the transition sequence for linear time operation. Comparison between two transition sequences also takes linear time. Thus, it is now time-efficient to identify the common prefixes for regular expressions.

II. Method for Efficiently Grouping NFA by Common Prefix

Given the time-efficient method for identifying common prefixes among regular expressions it is then necessary to apply this to NFA creation in order to create a minimal NFA. During typical NFA construction it is necessary to add a new branch to the NFA whenever a state has an incoming state. Thus, two regular expressions ab*cd and ab*ce if added to a single NFA would create an NFA that recognizes the regular expression a(b*cd|b*ce). The problem is that local information is insufficient to recognize that the common prefix continues past the repetition marker (*) which would cause a self-reference in the respective NFA. That self-reference would then be treated as an incoming transition and prevent further combining of the shared prefix. However, the present disclosure identifies such shared prefixes first and thus has the necessary information to decide whether or not a new branch is needed in the NFA. That information is the length of the common prefix. This allows the NFA creation to remove many redundant paths that would otherwise exist in the final version of the NFA.

The present disclosure creates a more efficient NFA following three stages. Stage one involves grouping of regular expression by minimum-length common prefixes. Stage two identifies longest common prefixes within groups sharing a common prefix, and Stage three merges the regular expressions into the compressed NFA.

The benefit is that the compressed NFA has fewer states near the root as well as fewer paths to explore. This creates a smaller NFA that can handle pattern matching with considerably less state requirements. This directly translates to much higher throughput matching traffic that heavily intersects with the set of regular expressions.

Grouping Regular Expressions by Minimum Common Prefix

In the first pass, every regular expression is converted into a transition sequence. The first j steps, also termed the minimum shared prefix length, in the transition sequence are converted into a string code for that particular regular expression for some j>0. This code is just a character representation of all the transitions in each transition set at each step in the transition sequence from step 0 to step j. Order is preserved, as are all decorations. Further, each character is represented as a 2-digit hexadecimal value. Thus, the same transition sequence will always produce the same code. Now, assume that two or more regular expressions share a common prefix that is k in length. If $0<j\leq k$, then those regular expressions will also share the same prefix j in length. This code is used as an index in a map of groups. If the index already exists within the map when the code is derived from the transition sequence, then that means the regular expression shares at least a common prefix j steps in length with one or more other regular expressions. The regular expression and transition sequence is added to the group at that index. If the index does not exist, then a new group is created and the regular expression and transition sequence is added to that new group.

Once all of the regular expressions have been processed all regular expressions that have common prefixes j steps or longer will be in groups of two or more. All regular expressions that have no common prefix j steps or longer will be in groups of one. This first step eliminates the need for evaluating singletons beyond this stage, likely reducing the number of regular expressions examined in later stages. Further, this first stage is performed in linear time as per the number of regular expressions. Finally, the value of j should be large enough such that the entire set of regular expressions is not simply subsumed into one large group. Typically a value for j of 3 or 4 is sufficient to the task though the actual value for j will depend on the set of regular expressions. Regardless, the impact of the size of j is only on the runtime of the algorithm, not on its accuracy.

Figure 5:
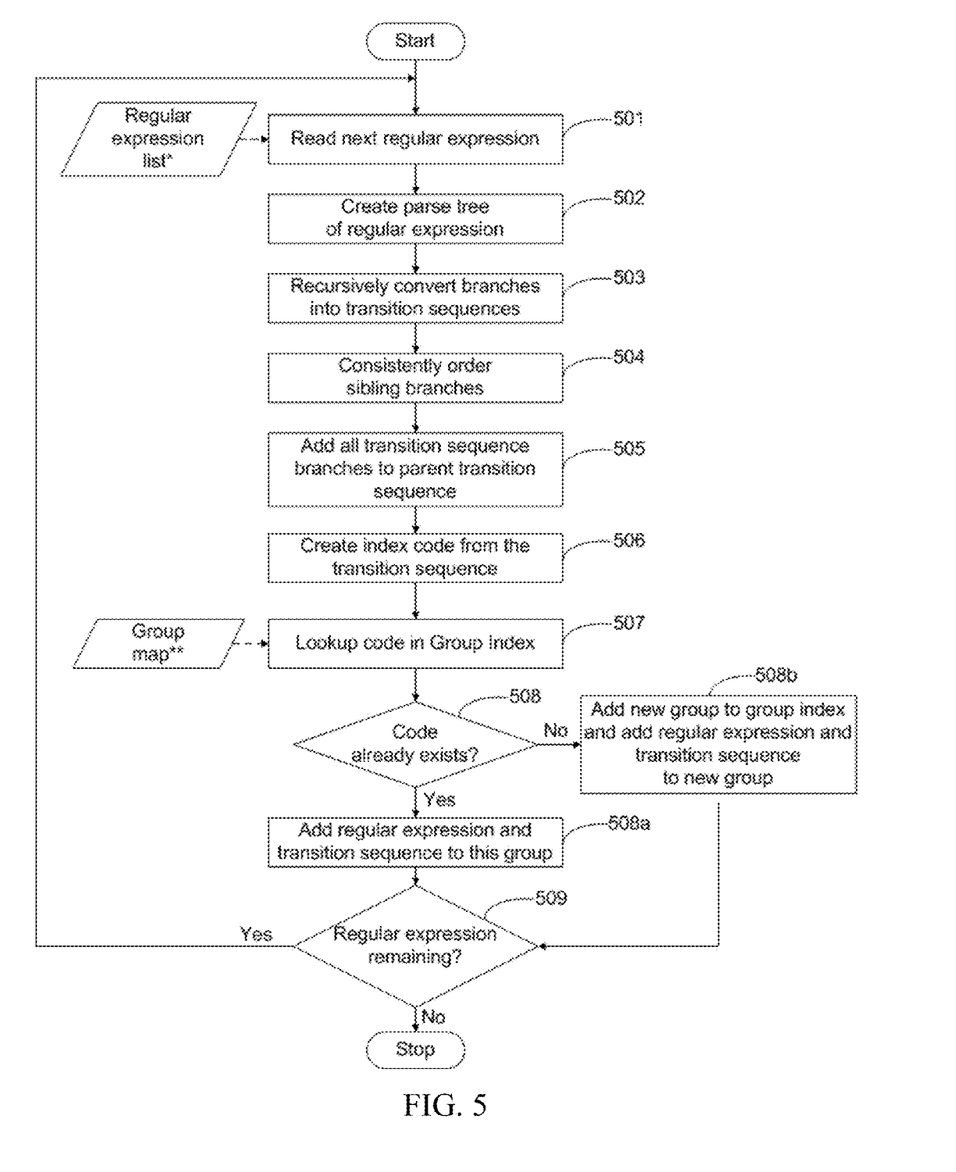
FIG. 5 is a flowchart illustrating a process of converting regular expressions into transitions sequences and then adding them to a group.

FIG. 5 is a flowchart illustrating a process of converting regular expressions into transitions sequences and then adding them to a group. In Step 501, the next regular expression is taken from the list of regular expressions provided as input (marked by the single *). In Step 502, the regular expression is converted to a parse tree as per normal regular expression conversion utilizing a readily available library such as the Perl Compatible Regular Expression library (PCRE). The actual library used is unimportant so long as the same library is used for all regular expressions. In Steps 503-505, the parse tree is flattened. Flattening is accomplished by recursively following all possible paths through the parse tree (Step 503) and adding possible transitions to transition sets at the given depth within the parse tree (Steps 504 and 505). An example of a parse tree and a flattened parse tree can be found in FIG. 2 and FIG. 3 respectively, and recursively following branches are illustrated in FIG. 4. In Step 506, an index code is generated from the newly created transition sequence. This code consists of the first j steps within the transition sequence converted into a character code. The code is then used as an index reference to the group map (**). In Step 508, if the reference is found (Step 508b) this means that one or more prior regular expressions processed share a prefix of at least the minimum shared prefix length as the current regular expression. In this case, we add the current regular expression (with its transition sequence) to this group. If the code is not found in the group map, then this regular expression currently shares no common prefix with the regular expressions processed so far. In Step 508a, a new group is created and the regular expression and transition sequence are added to the new group. Finally, in Step 509, if there are unprocessed regular expressions remaining then the entire flow is repeated, otherwise it ends.

Subgrouping by Longest Common Prefix

Assuming there is more than one regular expression in a group, subgroups are created within a group by identifying the longest common prefixes among the regular expressions that have been added to a group. Identifying the longest common prefix requires comparing every regular expression to every other regular expression in that group which requires exponential time. However, we noted that the merging process requires identifying longest common prefixes among subgroups as well, and thus we can take some shortcuts during the subgrouping stage in order to save time.

In fact, we can accomplish an approximation of optimal subgrouping in half as many steps. The process works like this. A regular expression is taken from the list of regular expressions for a group. It is compared to all of the regular expressions in all of the current subgroups. If the longest prefix match for that particular regular expression exactly matches one of the subgroups, then that regular expression is added to that subgroup. If the longest prefix match for that regular expression is longer than the prefix for the subgroup of the matching regular expression, then a new group is created and that regular expression, along with the regular expression to which it matched (which is removed from the old group), are added to the new group. This may leave the old group a singleton. Finally, if the regular expression does not have a longest prefix match at least as long as the longest prefix match for any subgroup, then that regular expression is added to its own group as a singleton. This process favors longest prefix matches and regular expressions that do not fit well are placed into singleton groups. This process can be completed in roughly $n(n-1)/2$ number of steps which is much better than the previous $n^2$ number of steps.

Figure 6:
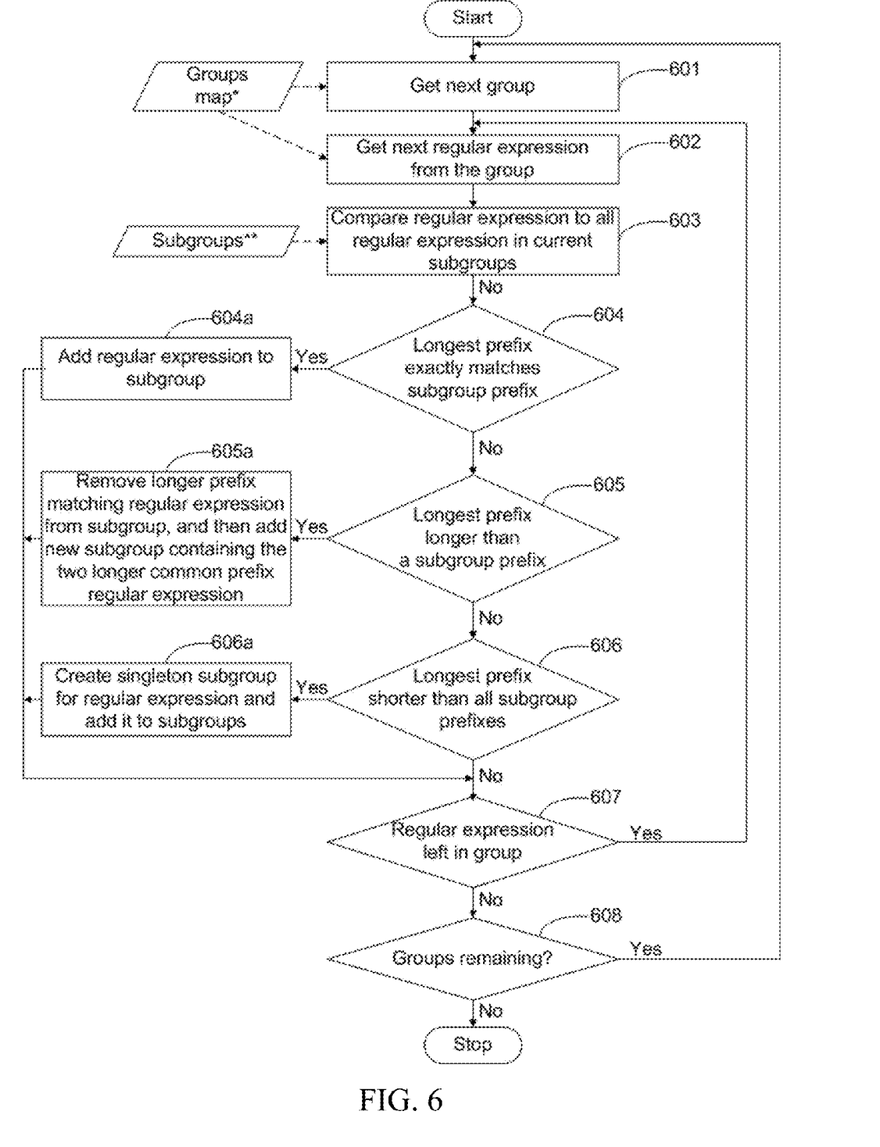
FIG. 6 is a flowchart illustrating a process of creating subgroups within each group of regular expressions.

FIG. 6 is a flowchart illustrating the process of creating subgroups within each group of regular expressions. The purpose of subgroups is to identify the longest common prefixes, while the purpose of groups is to identify a minimum length common prefix. In Step 601, we iterate through each group by getting the next group in the groups map. In Step 602, we grab the next unprocessed regular expression for that group. In Step 603, we compare that regular expression to all other regular expressions in current subgroups. In Step 604, we test to see if the longest common prefix match for the current regular expression exactly matches the prefix for a subgroup. If it does, then we add that regular expression to that subgroup (Step 604a). In Step 605, we test to see if the longest common prefix match for the current regular expression matches a regular expression to a longer depth than the length of the prefix for that subgroup. In that event we remove the matching regular expression from its subgroup and combine it with the current regular expression into a new subgroup with the longer common prefix (Step 605a). This could leave the original subgroup as a singleton. At Step 606 we test to see that if the current regular expression does not match as long as the prefix for any subgroup, then we make it a singleton subgroup (Step 606a.). We continue this for every regular expression within a group (Step 607), and then repeat the process for each group (Step 608).

Merging Regular Expressions with Common Prefixes

The final step in the process is to merge the regular expressions into a compressed NFA that can work as the matcher. To do this, we first create a merged NFA for all regular expressions in each subgroup of a group. To merge regular expressions in a subgroup is straightforward. First, the common prefix for the subgroup is known from the previous process. As such, we can create an NFA for the prefix. Further, since we know the length of the prefix, we can create NFA for all of the regular expressions within the group starting at the point where the prefix ends, the NFA being termed the remainder NFA. This will give us exactly $n+1$ NFA where n is the number of regular expressions in the subgroup. To effect the merging we simply take one of the remainder NFA and merge its start state with all of the final states in the prefix NFA. We continue doing this until all regular expressions for the subgroup have been merged into the prefix NFA thus creating the subgroup NFA. By definition of creation there was exactly one prefix used for all n regular expressions. This is what we term a prefix-minimal NFA. Out to the length of the prefix, we are guaranteed that there are no redundant paths. We note that if there is only one regular expression in the subgroup, then it is simply converted into an NFA without any other treatment.

Once all of the subgroups have been converted into subgroup NFA, we proceed to merge all subgroup NFA into a single group NFA. This is done iteratively. First, the prefix for each subgroup is known. Further, the prefix for each subgroup is a longest common prefix. As such, we know that prefixes common among subgroups will be that length or shorter, and thus we have all of the information we need to determine the longest common prefix among subgroups. So we find the two subgroups with the longest common prefix and remove them from the group. We merge these two subgroups in the same fashion as explained in the previous paragraph. We then re-add this merged subgroup to the list of subgroups for the group, updating the shared prefix to fit the new subgroup. When the number of subgroups for the group is one, then we have finished merging the subgroup NFA into the group NFA. This process will take $m-1$ iterations where m is the number of subgroups in the group.

Figure 7:
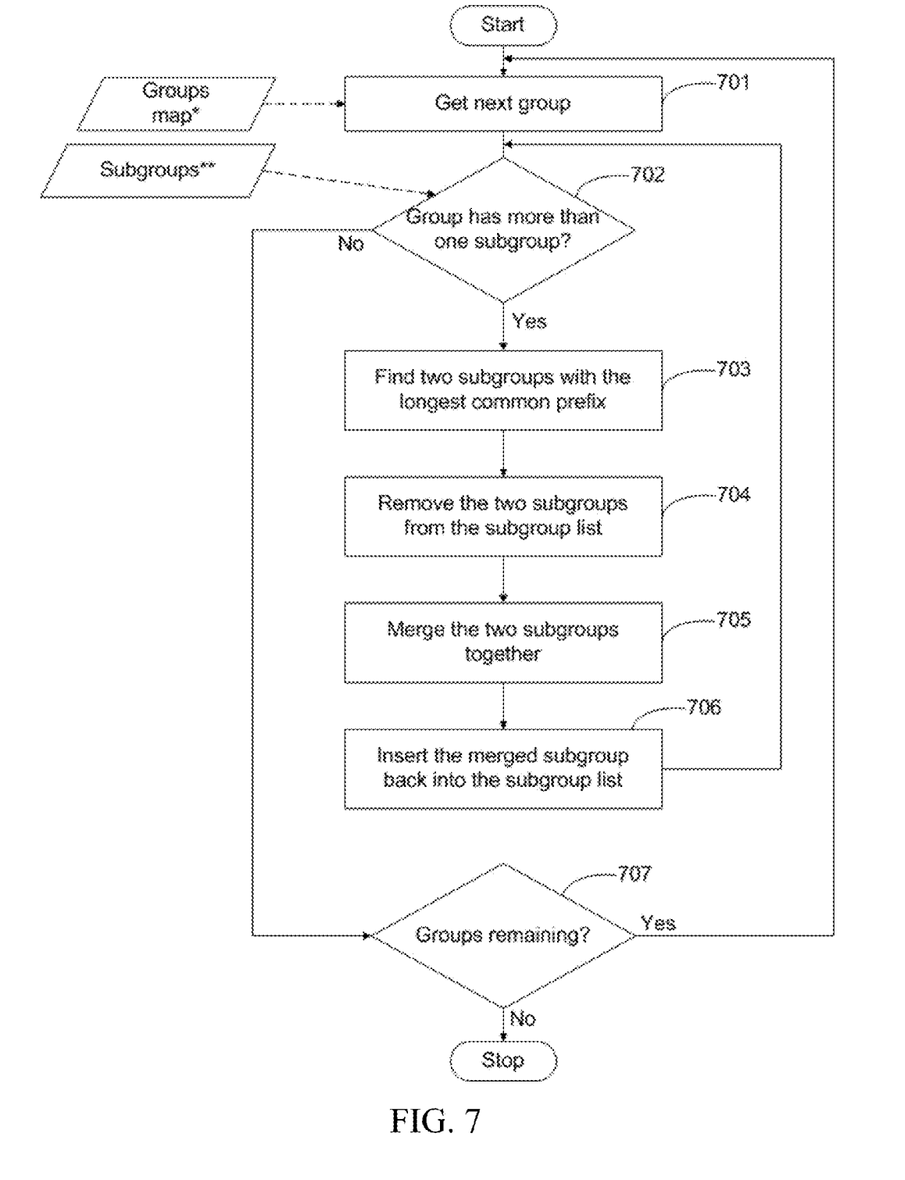
FIG. 7 is a flowchart illustrating the process of merging subgroups into a group NFA.

FIG. 7 is a flowchart illustrating the process of merging subgroups into a group NFA. In Step 701, we get the next group. If that group has more than one subgroup (Step 702), then find two subgroups that share the longest common prefix (Step 703). The two subgroups are removed from the subgroups list (Step 704), merged (Step 705), and then reinserted into the subgroups list (Step 706). If there is still more than one subgroup, then the process is repeated. The Steps 701-706 are performed for each group (Step 707).

Figure 8:
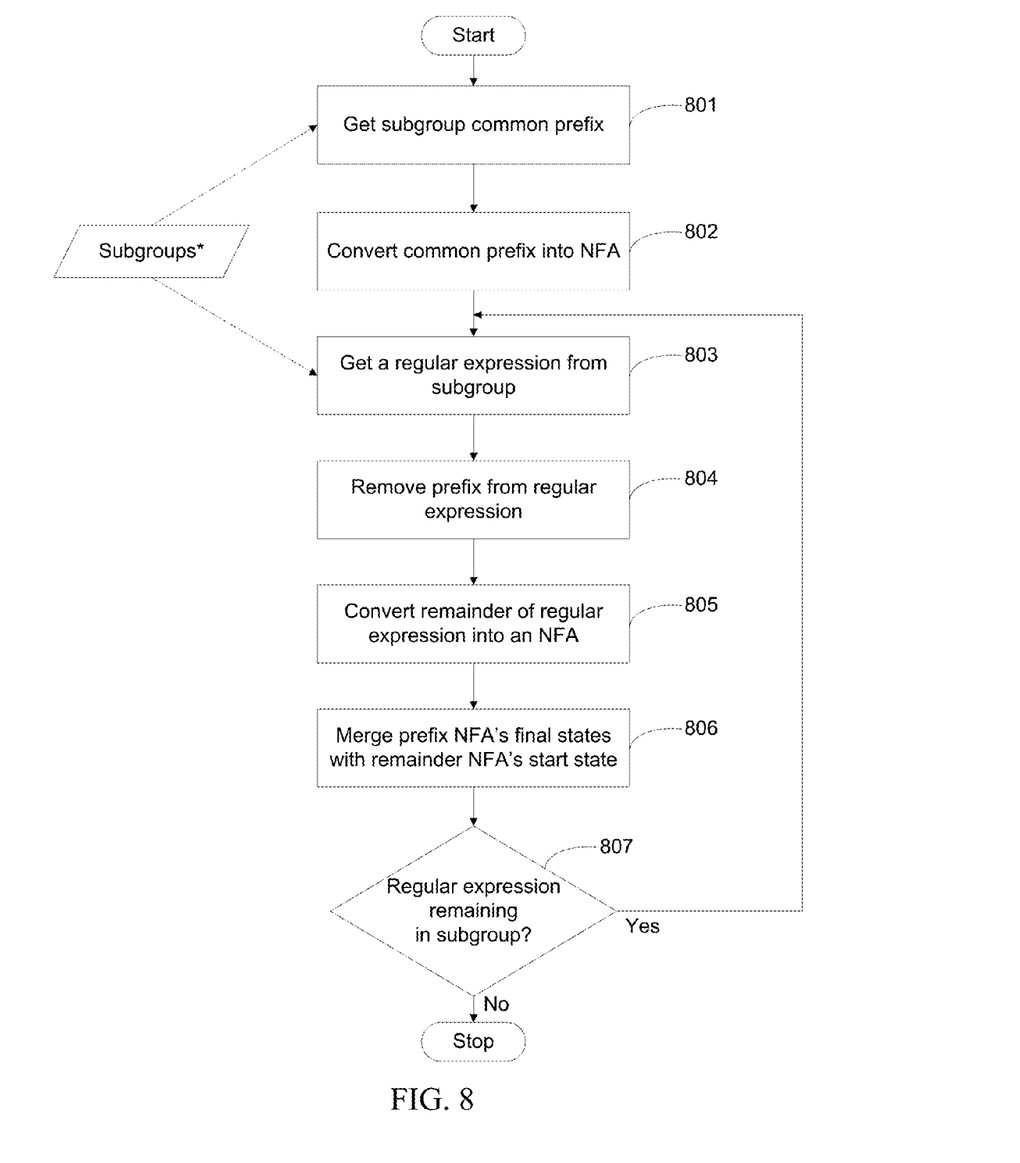
FIG. 8 is a flowchart illustrating how regular expressions with a common prefix are merged.
Figure 9A:
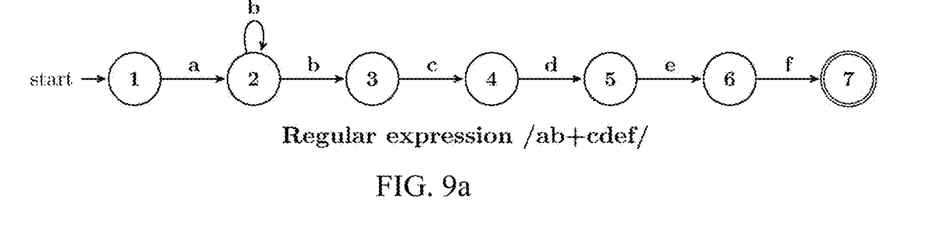
FIGS. 9a and 9b illustrate NFA of two regular expressions (/ab+cdef/ and /ab+cghi/) to be merged, respectively.
Figure 9B:
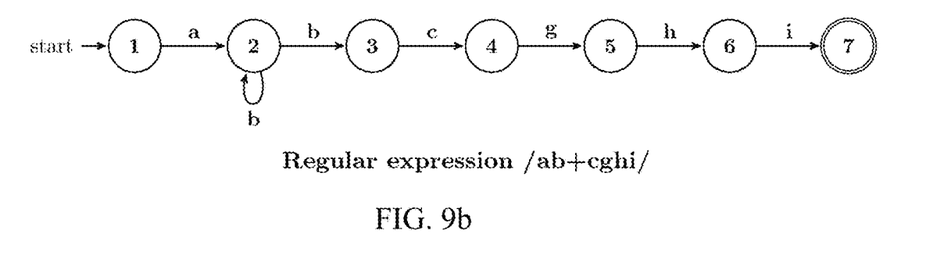
Figure 10A:
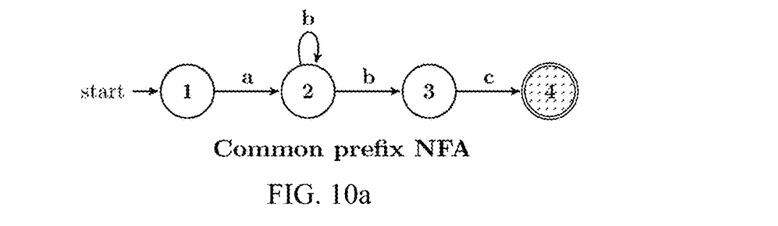
FIGS. 10a-10c show breaking of the regular expressions /ab+cdef/ and /ab+cghi/ into their common prefix and remainders.
Figure 10B:
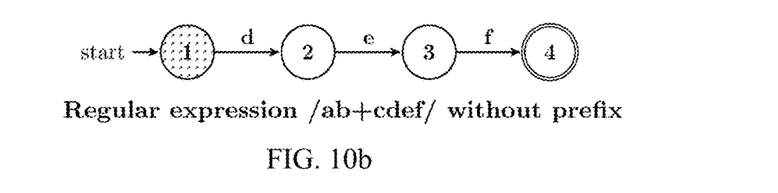
Figure 10C:
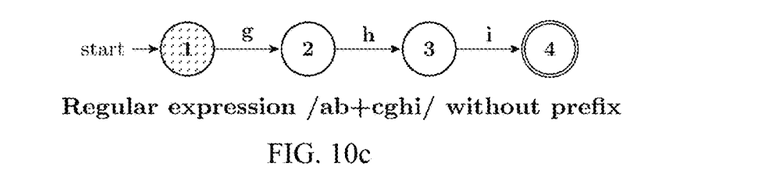
Figure 11:
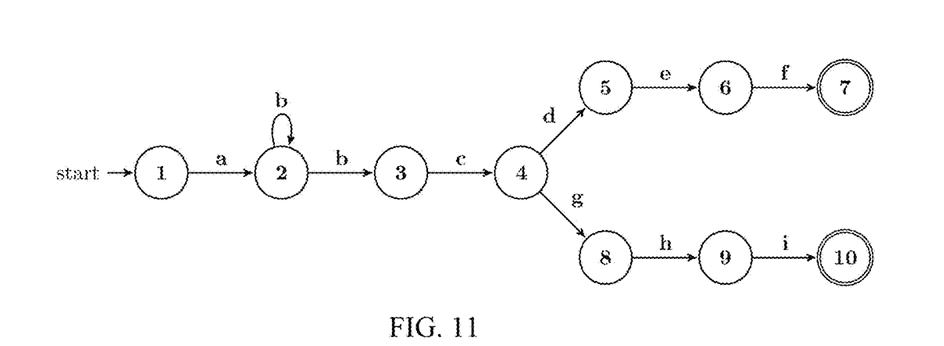
FIG. 11 illustrates the merging of the final states of the common prefixes with the remainder of the two regular expressions /ab+cdef/ and /ab+cghi/ to create the merged NFA of the two regular expressions.

FIG. 8 is a flowchart illustrating how regular expressions with a common prefix are merged within a subgroup. This is actually the general process through which NFA are merged though the illustration shows the specific process for merging a subgroup. Regardless, the common prefix for the subgroup is known (Step 801) and is converted into a prefix NFA (Step 802). In Step 803, a regular expression is retrieved from the subgroup. In Step 804, the prefix is removed from the regular expression so that, when it is converted into a remainder NFA, it contains only the remainder of the regular expression not shared with the other regular expressions (Step 805). In Step 806, the remainder NFA start states are merged with the final states of the prefix NFA. The Steps 803-806 are repeated for each regular expression within the subgroup (Step 807). FIGS. 9-11 further illustrate this process. FIGS. 9a and 9b respectively show the two regular expressions, abcdef and abcghi that share the common prefix abc. FIGS. 10a-10c show the prefix NFA (FIG. 10a), and the two remainder NFA (FIG. 10b and FIG. 10C). The final state of the prefix NFA is highlighted and the start states of the remainder NFA are highlighted. FIG. 11 shows the result of merging the prefix NFA final state with the remainder NFA start states.

Finally, once all of the subgroups have been merged into group NFA, it is time to merge all of the groups into the unified NFA. This process utilizes an approach similar to what we did for the initial grouping of the regular expressions. We make the observation that all of the groups had prefix j or longer where j is the minimum shared prefix length. Thus, if we shorten j, we can find all of the groups that share a common prefix of (j–1), etc. This can be done iteratively until j=1, at which point all remaining groups are simply tied to the compressed NFA. More specifically, we decrease j by one. We then iterate through every group and create a new prefix code for each group which we insert into a temporary map. All groups that cluster to the same code share the same prefix at that new prefix length. Once all of the codes have been generated, we walk through all of the codes and identify codes that have two or more groups. Those groups are removed from the groups map, merged as above, and then replaced into the group map. Once the temporary map has been completely evaluated, the minimum shared length is decreased again and the process is repeated. This is continued until decreasing j would make zero. At that point, the process is complete. This final merging ensures that, for any prefix shared among groups, there are no redundant paths. A start state is created and tied to all remaining groups and the result is the compressed NFA.

Figure 12:
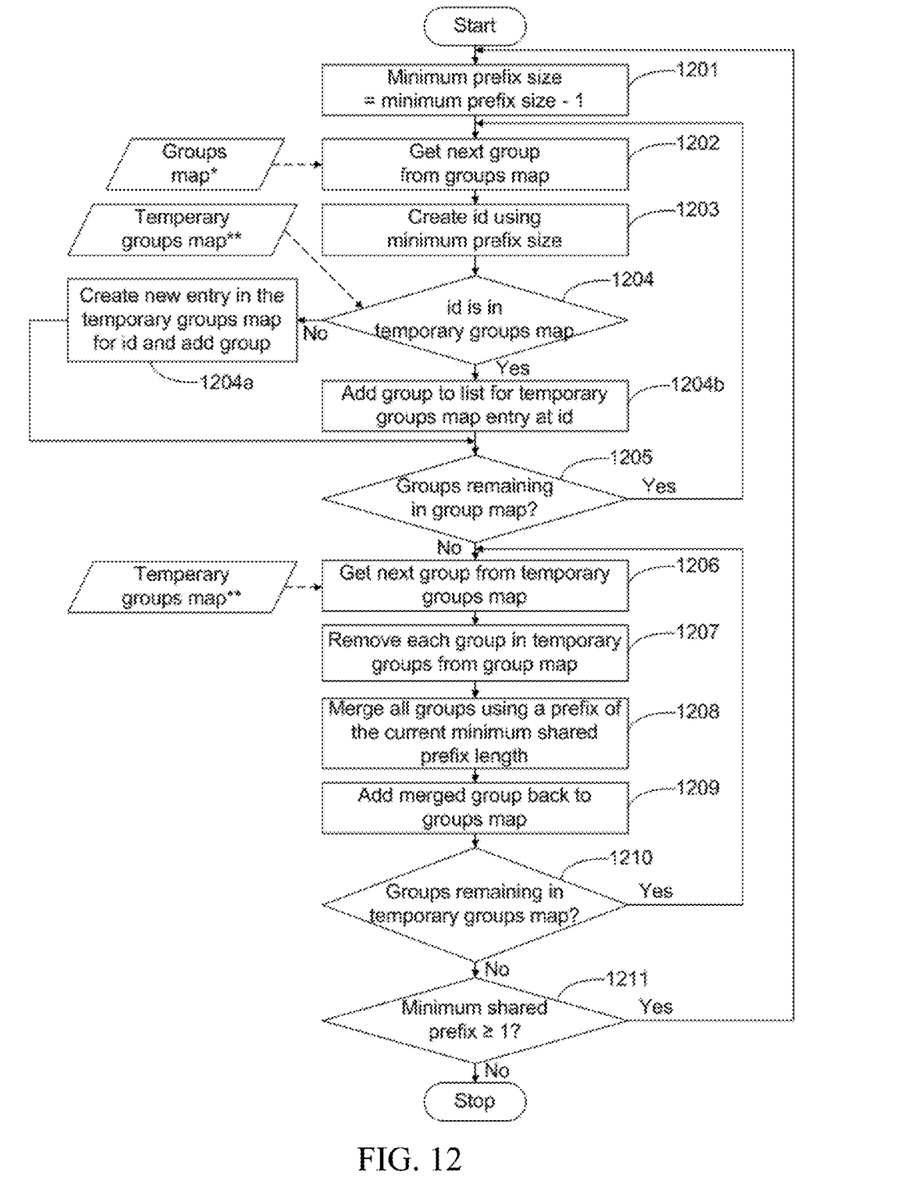
FIG. 12 is a flowchart illustrating a process of merging groups.

FIG. 12 is a flowchart illustrating a process of merging groups. In Step 1201, the minimum shared prefix length is decreased by one. In Step 1202, we take the next group from the map and create a new code for it using the now shorter minimum shared prefix length (Step 1203). In Step 1204, we test to see if the code exists in a temporary group map. If it does, then we have a shared prefix for that group at that length. We add this group to a list at the indicated id in the temporary group map (Step 1204b). If the group does not match, it is added to a new entry in the temporary map at id (Step 1204a). The Steps 1202-1204 are repeated for each group in the groups map (Step 1205). Once all of the groups have been processed, then we process the temporary groups map. In Step 1206, the next group from the temporary groups map is obtained from the temporary groups. The groups referenced in the temporary groups map at a given id are removed from the groups map (Step 1207). Those groups are all merged into a single group in an identical fashion to how subgroups are merged (Step 1208) and then the merged group is re-added to the groups map (Step 1209). The Steps 1206-1209 are repeated for all groups in the temporary groups map (Step 1210). Once the temporary groups map has been processed, if the minimum shared length is less than 1, then the process stops. Otherwise, the whole process (Steps 1201-1210) repeats from Step 1201 (Step 1211).

What is claimed is:

1. A method for compressing matching automata through common prefixes in regular expressions, comprising:

converting a set of regular expressions into transition sequences in such a way that it allows side-by-side comparison of two regular expressions in linear time;

grouping the set of regular expressions into groups based on a predetermined prefix length which is a minimum shared prefix length;

subgrouping the groups into subgroups containing longest common prefixes;

merging the set of regular expressions in the subgroups into a subgroup Non-deterministic Finite Automata (NFA), and then the subgroup NFA into a group NFA and then the group NFA into a final, prefix-minimal NFA comprised of;

merging all regular expressions in a subgroup through a merging of final states of prefix NFA to the start states of remainder NFA, with singleton subgroups being converted directly to NFA;

iteratively merging the subgroups together by longest common prefix until only a single subgroup remains, the single subgroup being the group NFA;

iteratively decrementing the minimum shared prefix length and re-assigning groups to indices within a temporary group map and then merging all the group NFA that share a shorter prefix length; and creating a start state for the prefix-minimal NFA and adding transitions from the start state to all remaining groups once the minimum shared prefix length reaches zero.

2. The method of claim 1, wherein the converting a set of regular expressions into transition sequences comprises:

creating parse trees of the set of regular expressions utilizing a readily available library;

recursively converting branches into the transition sequences; and adding all transition sequence branches to a parent transition sequence.

3. The method of claim 1, wherein the grouping the set of regular expressions into groups based on a predetermined prefix length comprises:

creating an index from a first predetermined prefix length of transitions in the transition sequences;

adding the set of regular expressions and the transition sequences to the group at the index in a group map; and creating an entry at the index if no such entry previously existed.

4. The method of claim 1, wherein the subgrouping the groups into subgroups containing longest common prefixes comprises:

comparing the regular expressions in a group to all other regular expressions in current subgroups; and adding each regular expression that matches the longest common prefix of a subgroup to the subgroup in such a way that all regular expressions that share the longest common prefix are in the subgroup, or to a singleton subgroup if the regular expression does not have the longest common prefix match for any subgroup.

5. A method in a Network Intrusion Detection System for filtering incoming traffic, comprising:

obtaining a rule set for the filtering of the incoming traffic, the rule set comprising a set of regular expressions;

converting the set of regular expressions into transition sequences in such a way that it allows side-by-side comparison of two regular expressions in linear time;

grouping the set of regular expressions into groups based on a predetermined prefix length which is a minimum shared prefix length;

subgrouping the groups into subgroups containing longest common prefixes;

merging the set of regular expressions in the subgroups into a subgroup Non-deterministic Finite Automata (NFA), and then the subgroup NFA into a group NFA and then the group NFA into a final, prefix-minimal NFA, comprised of;
  merging all regular expressions in a subgroup through a merging of final states of prefix NFA to the start states of remainder NFA, with singleton subgroups being converted directly to NFA;
  iteratively merging the subgroups together by longest common prefix until only a single subgroup remains, the single subgroup being the group NFA;
  iteratively decrementing the minimum shared prefix length and re-assigning groups to indices within a temporary group map and then merging all the group NFA that share a shorter prefix length; and
  creating a start state for the prefix-minimal NFA and adding transitions from the start state to all remaining groups once the minimum shared prefix length reaches zero; and filtering the incoming traffic using the final, prefix minimal NFA to identify suspicious portions of the incoming traffic for further processing.

6. The method of claim 5, wherein the converting a set of regular expressions into transition sequences comprises:

creating parse trees of the set of regular expressions utilizing a readily available library;

recursively converting branches into the transition sequences; and adding all transition sequence branches to a parent transition sequence.

7. The method of claim 5, wherein the grouping the set of regular expressions into groups based on a predetermined prefix length comprises:

creating an index from a first predetermined prefix length of transitions in the transition sequences;

adding the set of regular expressions and the transition sequences to the group at the index in a group map; and creating an entry at the index if no such entry previously existed.

8. The method of claim 5, wherein the subgrouping the groups into subgroups containing longest common prefixes comprises:

comparing the regular expressions in a group to all other regular expressions in current subgroups; and adding each regular expression that matches the longest common prefix of a subgroup to the subgroup in such a way that all regular expressions that share the longest common prefix are in the subgroup, or to a singleton subgroup if the regular expression does not have the longest common prefix match for any subgroup.

* * * * *